United States Patent [19]

Itoh et al.

[11] Patent Number: 4,769,722
[45] Date of Patent: Sep. 6, 1988

[54] APPARATUS FOR RECORDING AND REPRODUCING A VIDEO SIGNAL AND FOR RECORDING AND REPRODUCING A PCM AUDIO SIGNAL ON FORWARD AND REVERSE TAPE TRAVELLING DIRECTIONS

[75] Inventors: Shigeyuki Itoh, Yokohama; Yoshizumi Watatani, Fujisawa; Akira Shibata, Katsuta; Koji Kaniwa, Yokohama, all of Japan

[73] Assignee: Hitachi, Ltd., Tokyo, Japan

[21] Appl. No.: 805,788

[22] Filed: Dec. 6, 1985

[30] Foreign Application Priority Data

Dec. 7, 1984 [JP] Japan ................................. 59-257580

[51] Int. Cl.[4] .......................... G11B 5/02; G11B 15/44
[52] U.S. Cl. ......................................... 360/27; 360/18; 360/19.1; 360/32
[58] Field of Search ........................ 360/18, 27, 73, 75, 360/19.1, 32, 74.4; 369/47, 48

[56] References Cited

U.S. PATENT DOCUMENTS

| | | | |
|---|---|---|---|
| 3,913,135 | 10/1975 | Damlamian | 360/18 |
| 4,249,220 | 2/1981 | Yusutake et al. | 360/73 |
| 4,346,397 | 8/1982 | Ota | 360/75 |
| 4,389,681 | 6/1983 | Tanaka et al. | 360/27 |
| 4,521,815 | 6/1985 | Tokuyama | 360/75 |
| 4,550,345 | 10/1985 | Terada et al. | 360/27 |
| 4,583,134 | 4/1986 | Nakamichi | 360/27 |

Primary Examiner—Raymond F. Cardillo
Assistant Examiner—Surinder Sachar
Attorney, Agent, or Firm—Antonelli, Terry & Wands

[57] ABSTRACT

A helical scanning type magnetic recording and reproducing apparatus records a signal representing recording conditions on a magnetic tape when a recording is effected thereon, together with a PCM audio signal. At the time of reproduction, reproducing conditions are controlled so as to be the same as the recording conditions on the basis of the signal representing recording conditions reproduced.

4 Claims, 16 Drawing Sheets

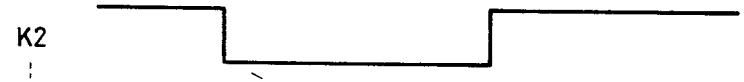
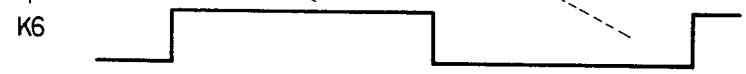
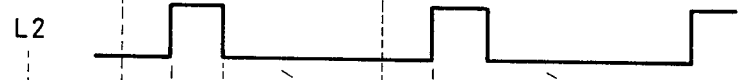
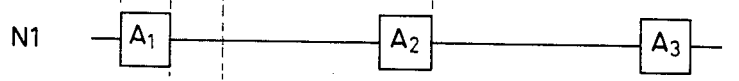

| MODE | RECORDING CONDITIONS | | | | |
|---|---|---|---|---|---|
| | 1 | 2 | 3 | NOTE 4 | 5 |
| MULTICHANNEL PCM METHOD (ON/OFF) | ON | ON | ON | ON | OFF |
| TAPE TRAVELING DIRECTION (REVERSE/FORWARD)(R/F) | R | F | R | F | — |
| SP/LP MODE (S/L) | S | S | L | L | — |
| AUTOMATIC REVERSE RECORDING (ON/OFF) | ON | ON | OFF | ON | — |
| ID SIGNAL BIT 0 | 1 | 1 | 1 | 1 | 0 |
| ID SIGNAL BIT 1 | 1 | 0 | 1 | 0 | 0 |
| ID SIGNAL BIT 2 | 0 | 0 | 1 | 1 | 0 |
| ID SIGNAL BIT 3 | 1 | 1 | 0 | 1 | 0 |
| ID SIGNAL BIT 4 | 0 | 0 | 0 | 0 | 0 |
| ID SIGNAL BIT 5 | 0 | 0 | 0 | 0 | 0 |
| ID SIGNAL BIT 6 | 0 | 0 | 0 | 1 | 0 |
| ID SIGNAL BIT 7 | 0 | 0 | 0 | 0 | 0 |

(NOTE) BIT 4–BIT 7 IN COLUMN 4 INDICATE CHANNEL SELECT SIGNAL K2

FIG. 13

| ID DATA | RECORDED CHANNEL | NO.1 | | | | | NO.2 | | | | NO.4 | | | | NO.1 | | |
|---|---|---|---|---|---|---|---|---|---|---|---|---|---|---|---|---|---|
| | BIT 5 | 0 | 0 | ---- | 0 | 0 | 0 | 0 | ----- | 0 | 1 | 0 | 0 | ----- | 0 | 0 | 0 | --- |
| | BIT 6 | 0 | 0 | ---- | 0 | 1 | 0 | 0 | ----- | 0 | 0 | 0 | 0 | ----- | 0 | 0 | 0 | --- |
| | BIT 7 | 0 | 0 | ---- | 0 | 0 | 0 | 0 | ----- | 0 | 0 | 0 | 0 | ----- | 0 | 1 | 0 | --- |

▲ CHANGING POINT OF RECORDED TRACK; NEXT RECORDED CHANNEL IS NO. 2

▲ CHANGING POINT OF RECORDED TRACK; NEXT RECORDED CHANNEL IS NO. 4

▲ CHANGING POINT OF RECORDED TRACK; NEXT RECORDED CHANNEL IS NO.1

FIG. 14

| ID DATA | RECORDED CHANNEL | NO.1 | | | | | | NO.3 | | | | | NO.5 | | | NO.2 |
|---|---|---|---|---|---|---|---|---|---|---|---|---|---|---|---|---|
| | BIT 5 | 1 | 0 | 0 | ---- | 0 | 0 | 0 | 1 | 0 | 0 | ----- | 0 | 1 | 1 | 1 | 0 | 0 | --- | 0 | 0 | 0 | 1 |
| | BIT 6 | 1 | 0 | 0 | ---- | 0 | 1 | 1 | 1 | 0 | 0 | ----- | 0 | 0 | 0 | 1 | 0 | 0 | --- | 0 | 1 | 1 | 1 |
| | BIT 7 | 1 | 0 | 0 | ---- | 0 | 1 | 1 | 1 | 0 | 0 | ----- | 0 | 1 | 1 | 1 | 0 | 0 | --- | 0 | 0 | 0 | 1 |

▲ START OF RECORDING

▲▲ CHANGING POINT OF RECORDED TRACK; NEXT RECORDED CHANNEL IS NO.3

▲ START OF RECORDING

▲ CHANGING POINT OF RECORDED TRACK; NEXT RECORDED CHANNEL IS NO.5

▲ START OF RECORDING

▲▲ CHANGING POINT OF RECORDED TRACK; NEXT RECORDED CHANNEL IS NO. 2

( ): PILOT SIGNAL AT REVERSE ( ): PILOT SIGNAL AT REVERSE

APPARATUS FOR RECORDING AND REPRODUCING A VIDEO SIGNAL AND FOR RECORDING AND REPRODUCING A PCM AUDIO SIGNAL ON FORWARD AND REVERSE TAPE TRAVELLING DIRECTIONS

BACKGROUND OF THE INVENTION

The present invention relates to a helical scanning type magnetic recording and reproducing apparatus and, more particularly, to a digital information recording and reproducing apparatus suitable for recording and reproducing a digital audio signal which has been subjected to time base compression.

Helical scanning type digital information recording and reproducing apparatuses include a household video tape recorder known as the 8-mm standard video tape recorder in which a tape pattern such as that shown in FIG. 11 is employed.

In FIG. 11, the reference numeral 1 denotes a video tape, 2 a video track on which a video signal is recorded, 3 a first option track, 4 a second option track, 5 an arrow which indicates a direction in which a rotary head traces, 6 an arrow which indicates a video tape traveling direction, and 7 a track on which is recorded a signal which is obtained by converting an audio signal into a PCM (Pulse Code Modulation) signal and further compressing the time base into about 1/6 of its original value.

The reference symbols $\theta_1$, $\theta_2$, $\theta_3$ and $\theta_4$ in FIG. 11 respectively denote winding angles of the video tape 1 formed when it is wound on the rotary cylinder, wherein $\theta_1 \approx \theta_4 \approx 5°$, $\theta_2 \approx 180°$ and $\theta_3 \approx 30°$. The angle $\theta_2$ corresponds to a period during which a video signal is recorded, while the angle $\theta_3$ corresponds to a period during which an audio signal is recorded, while the angles $\theta_1$ and $\theta_4$ correspond to margins provided for ensuring interchangeability. Accordingly, when this video tape 1 is employed for the purpose of recording only an audio signal, only the area on the video tape 1 indicated by the numeral 7 in FIG. 11 is used for recording, which involves a disadvantageously low efficiency in terms of using the available (effective) area of the video tape to its maximum extent.

In order to overcome the above disadvantage, there is known a system in which, as shown in FIG. 12, the track 2 is divided into five regions B to F, and a timebase compressed PCM signal is recorded in each region in a manner similar to that in the track 7 in FIG. 11 (the track 7 corresponds to the region A in FIG. 12) (this system will be referred to as the "multichannel PCM method", hereinafter). (This system is mentioned in Japanese patent laid-open No. 222402/1983 and European patent application publication No. 0085578). The system increases audio signal recording density by a factor of six compared to that in the system shown in FIG. 11.

However, when the trailing end of the magnetic tape is reached while the audio signal is being recorded in one of the regions, it is necessary that the magnetic tape should be rewound to an appropriate position (in general, the start position of the magnetic tape), and then, the recording is resumed in another region, which fact makes it impossible to effect continuous recording (referred to as the "automatic reverse recording", hereinafter). Further, it involves a long waiting period corresponding to the time required for the magnetic tape to be rewound. Similarly, it is not possible to effect continuous reproduction or playback, and time is lost rewinding the magnetic tape. Further, recording modes include a so-called long play mode (referred to as the "LP mode", hereinafter) in which the magnetic tape traveling speed is reduced to, for example, ½, whereby the recording density is made twice as high as that in an ordinary recording mode, namely, the so-called standard play mode (referred to as the "SP mode", hereinafter). It is possible in the LP mode to effect recording over a period of time which is twice as long as that in the SP mode. Since it is possible in the system shown in FIG. 12 to record audio signals in the six regions in the recording modes different from each other, it is necessary to discriminate between the recording modes (SP/LP) at the time of reproduction. However, no consideration is taken in the above prior art.

SUMMARY OF THE INVENTION

In view of the above circumstances, it is a primary object of the present invention to provide a digital information recording and reproducing apparatus in which discrimination is made as to the magnetic tape traveling direction, the recording density (magnetic tape traveling speed) and so forth, whereby it is possible to automatically change over the operation mode of the servo circuit system, PCM circuit system and the like on the basis of the results of the discrimination.

To this end, according to the present invention, identification signals (referred to as "ID signals", hereinafter) for the magnetic tape traveling direction, the recording density and so forth are recorded on a magnetic tape, together with the PCM signal, whereby it is possible in reproduction or playback to automatically change over the operation mode of each of the servo circuit system, PCM circuit system and the like.

BRIEF DESCRIPTION OF THE DRAWINGS

FIGS. 2A to 2L are waveform charts showing the operation of the embodiment;

FIGS. 13 and 14 respectively show examples of ID data;

DETAILED DESCRIPTION OF THE PREFERRED EMBODIMENTS

One embodiment of the present invention will be described hereinunder with reference to the accompanying drawings.

Figure 1:
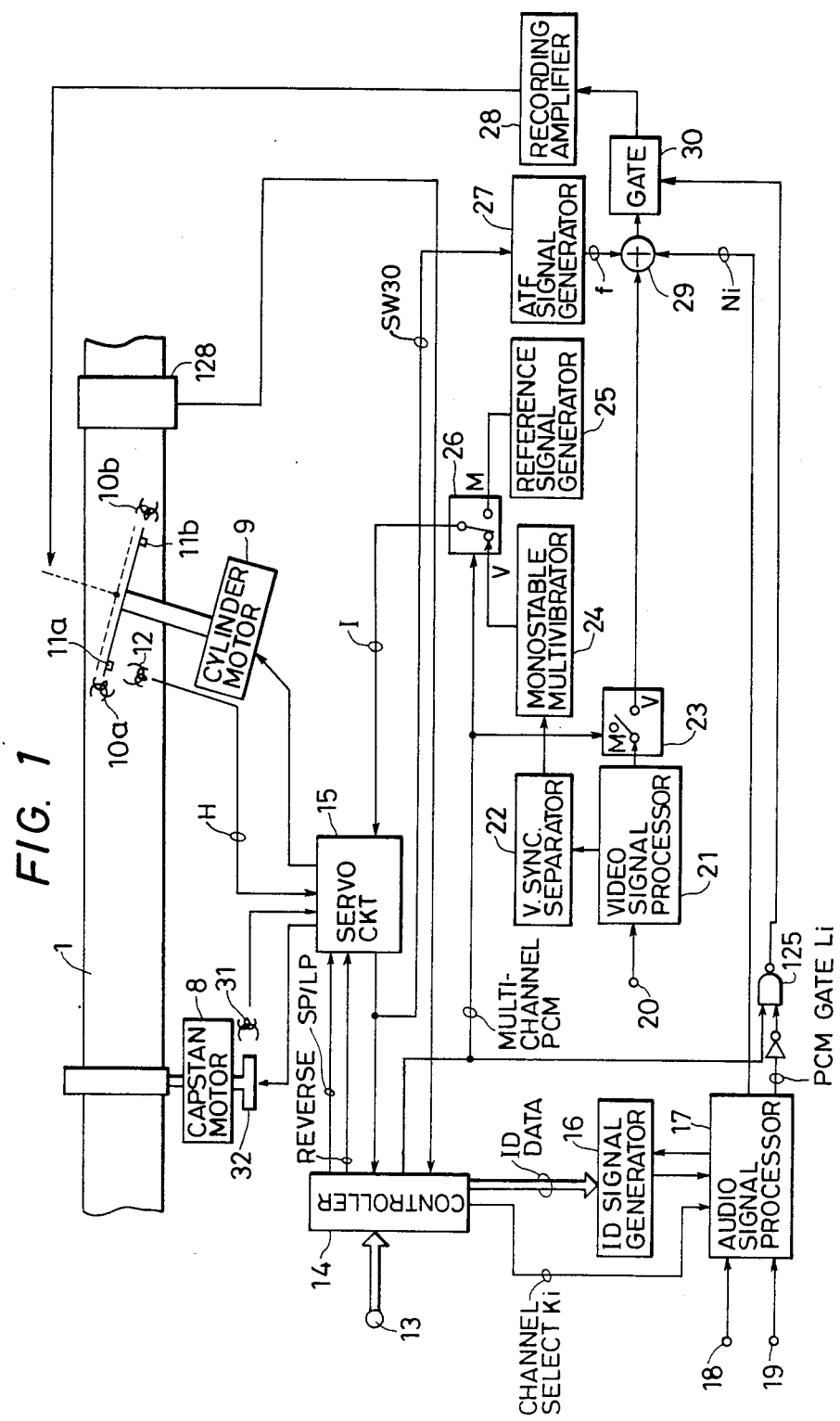
FIG. 1 is a block diagram showing circuits belonging to the recording system block in accordance with one embodiment of the present invention.

FIG. 1 shows one example of a recording system block of a 8-mm video standard digital information recording and reproducing apparatus to which the present invention is applied, while FIG. 2 is a waveform chart showing the respective operations of essential portions of the apparatus shown in FIG. 1. Referring to FIG. 1, recording conditions, such as the magnetic tape traveling direction, recording mode and recording method (multichannel PCM method or the video signal recording method), are input to a controller 14 from an input terminal 13. In accordance with the input recording conditions, the controller 14 delivers control signals to the servo circuit system, the audio signal processing system and the video signal processing system. The recording conditions are now assumed to be as follows:

(1) Tape traveling direction . . . reverse
(2) Recording mode . . . LP mode
(3) Recording method I . . . multichannel PCM method
(4) Recording method II . . . automatic reverse recording In response to the control signals delivered from the controller 14, a servo circuit 15 is controlled such that a frequency divider and the like in the circuit 15 are changed such as to meet the above recording conditions. In consequence, a capstan motor 8 is reversed, and the traveling speed is controlled such as to be reduced to ½. Further, the controller 14 outputs a channel select signal Ki (i=1, 2, . . . 6) which serves as a reference signal for signal processing to an audio signal processor 17, and delivers the recording conditions to an ID signal generator 16. In addition, switches 23, 26 are controlled such as to be connected to the M side.

In consequence, the servo circuit 15 controls the rotation of a cylinder motor 9 by the use of a pulse signal H (see FIG. 2B) obtained from two magnets 11a, 11b and a pickup head 12 mounted on the rotary cylinder, together with an output signal from a reference signal generator 25 employed as a reference signal. In this case, the waveform of the pulse signal H is shaped to obtain a switching signal with a frequency of 30 Hz. This switching signal will be referred to as "SW 30", hereinafter (see FIG. 2C). The capstan motor 8 is controlled by the so-called quartz lock system in order to maintain the tape traveling speed at a constant level. The servo circuit 15 makes phase comparison between a signal obtained from a frequency generator 32 mounted on the capstan motor 8 and a head 31 to detect the number of revolutions and a reference signal generated within the servo circuit 15.

The reference numeral 20 denotes a video signal input terminal, while the numeral 21 denotes a video signal processor which executes signal processing in accordance with recording and reproducing modes. In the recording mode, the processor 21 converts the frequency of the chrominance signal included in the video signal into a frequency belonging to a low band, and the processor 21 further converts the luminance signal into an FM (Frequency Modulation) signal. The numeral 23 denotes a switch to output the output signal of the video signal processor 21 to an adder 29. Under the above recording conditions, the switch 23 is connected to the M side so as to cut off the supply of the output signal of the processor 21 to the adder 29. The numeral 22 denotes a V.sync. separator which separates the vertical synchronizing signal from the video signal, while the numeral 24 denotes a monostable multivibrator which shapes the waveform of the output signal from the V.sync. separator 22. The output of the monostable multivibrator 24 is employed as a reference signal for controlling the cylinder motor 9 when the recording conditions include the video signal recording method for recording a video signal.

The reference numerals 18, 19 respectively denote input terminals for the audio signal, and the numeral 17 denotes an audio signal processor which processes an audio signal in accordance with the recording and reproducing modes. In the recording mode, the audio signal processor 17 converts the audio signal into a digital signal which has been compressed to 1/6 in terms of the time base, and further converts the digital signal into an FM signal Ni (i=1, 2, . . . 6) (see FIGS. 2J and 2K) which is then output to the adder 29. It is to be noted that the timing signal for time-base compressing the audio signal in the audio signal processor 17 and the clock signal for signal processing are generated on the basis of the channel select signal Ki output from the controller 14. In this case, the channel select signal Ki is obtained by phase-shifting the SW 30 shown in FIG. 2C in such a manner that shown in FIGS. 2D, 2E and 2F. Further, the signals representing recording conditions such as the tape traveling direction and the recording mode, which are output from the controller 14, are processed by the ID signal generator 16 as ID data and are then delivered to the audio signal processor 17 where they are added to the audio signal which has been processed therein so as to be converted into a digital signal.

Further, a four-frequency pilot signal f (see FIG. 2L) for effecting tracking control is output from an ATF (Automatic Track Finding) signal generator 27 to the adder 29.

The pilot signal f generated from the ATF signal generator 27 is output in that order, $f_1 \to f_2 \to f_3 \to f_4 \to f_1$ . . . , in accordance with the High/Low level of the SW 30 shown in FIG. 2C. Accordingly, when the SW 30 is at High level, the pilot signal $f_1$ or $f_3$ is output; when the SW 30 is at Low level, the pilot signal $f_2$ or $f_4$ is output. Examples of the frequency of the pilot signal f are as follows: $f_1 \approx 6.5$ fH; $f_2 \approx 7.5$ fH; $f_3 \approx 10.5$ fH and $f_4 \approx 9.5$ fH (fH: horizontal synchronizing signal frequency).

Figure 8:
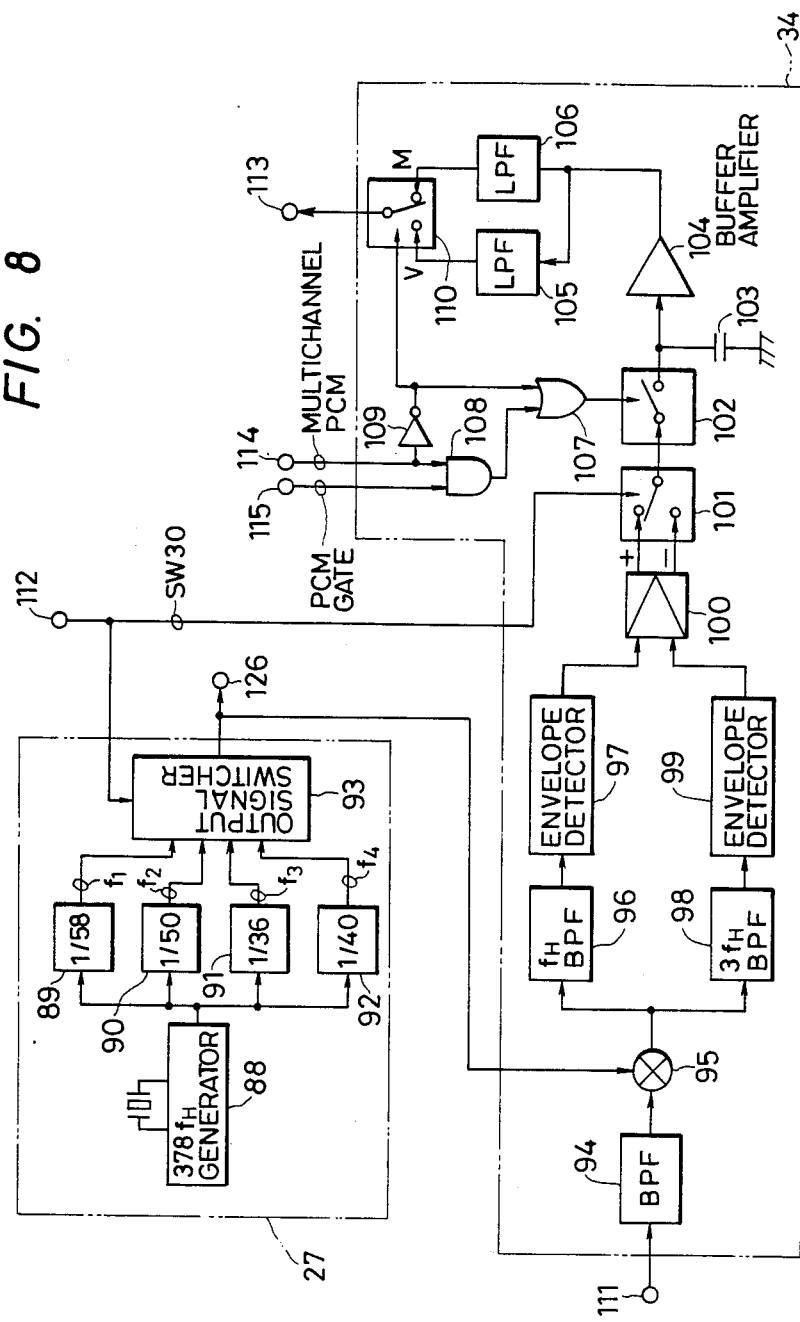
FIG. 8 is a block diagram of one example of the tracking control circuit.

FIG. 8 shows one example of the arrangement of the ATF signal generator 27.

The ATF signal generator 27 shown in FIG. 8 is arranged such that a reference signal generated from a 378 fH generator 88 is frequency-divided by four frequency dividers 89 to 92 to obtain four signals with frequencies different from each other, which are successively output from an output signal switcher 93 in accordance with the state of the SW 30.

The adder 29 adds together the digital FM signal Ni output from the audio signal processor 17 and the pilot signal f. The signal output from the adder 29 is passed through a gate 30 and a recording amplifier 28 and is then recorded on a magnetic tape 1 by rotary heads 10a, 10b. The recording position is designated by controlling the gate 30 using a PCM gate signal Li (i=1, 2, ... 6) (see FIGS. 2G, 2H and 2I) generated by the audio signal processor 17 in accordance with the channel select signal Ki output from the controller 14. In the video signal recording method, the gate 30 is constantly maintained in a conductive state by means of a NAND gate 125.

Figure 3:
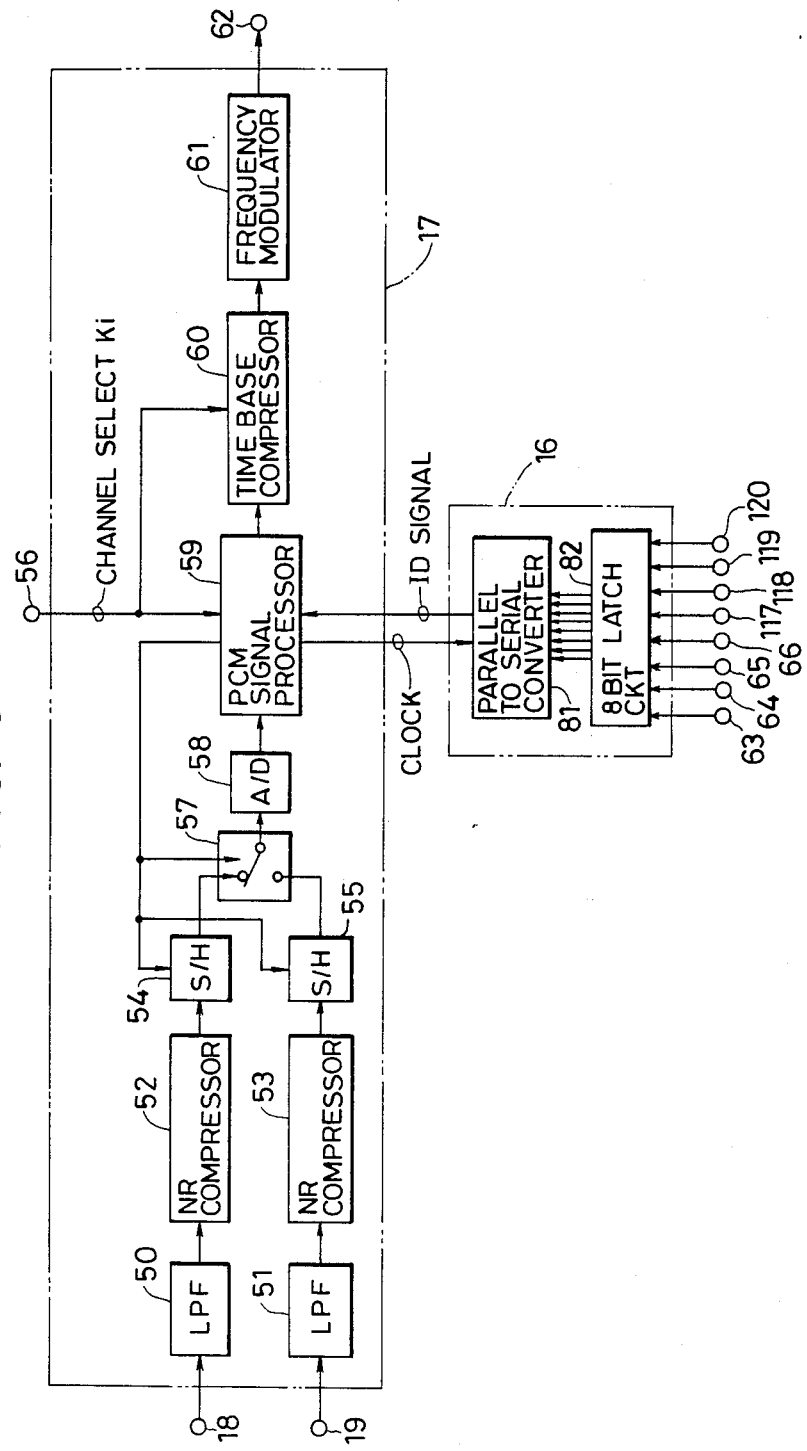
FIG. 3 is a block diagram showing one example of each of the audio signal processor and ID signal generator.

One example of each of the audio signal processor 17 and the ID signal generator 16 which are important constituent elements of the present invention will be described below with reference to FIG. 3.

Two-channel audio signals L, R input from the input terminals 18, 19 are respectively passed through 15 KHz cutoff low-pass filters (referred to as "LPF", hereinafter) 50, 51 where they are subjected to band restriction, and are then respectively supplied to noise reduction (referred to as "NR", hereinafter) compressors 52, 53 where their dynamic ranges are compressed to $\frac{1}{2}$. The thus compressed two-channel signals L, R are respectively sampled and held by sample and hold circuits (referred to as "S/H", hereinafter) 54, 55. The thus held two-channel signals R, L are alternately supplied through a switch 57 to an analog-to-digital converter (referred to as "A/D", hereinafter) 58 where each signal is converted into a 10-bit digital signal. In this case, the S/Hs 54, 55 are activated in response to a rise of a sampling signal with a sampling frequency of 31.5KHz output from a PCM signal generator 59, and the switch 57 is controlled in accordance with the High and Low levels of the sampling signal.

In the PCM signal processor 59, the output of the A/D 58 is subjected to conversion from the 10-bit signal into an 8-bit signal, and a correction code such as a parity bit and the ID data from the ID signal generator 16 are added to the output of the A/D 58, thus forming a PCM signal. The output of the PCM signal processor 59 is supplied to a time base compressor 60 where the time base is compressed to 1/6 of its orginal value, and is then converted into a digital FM signal by a frequency modulator 61 before being output to the adder 29 from an output terminal 62. In this case, the time base compressor 60 and the PCM signal processor 59 operate on the basis of the channel select signal Ki which is the output of the controller 14 that is input to an input terminal 56.

The ID signal generator 16 is constituted by an 8-bit latch circuit 82 and a parallel-to-serial converter 81. The 8-bit recording condition data output from the controller 14 are input to input terminals 63 to 66 and 117 to 120 so as to be latched and are then converted into a serial signal, which is delivered to the PCM signal processor 59. The parallel-to-serial converter 81 is activated in response to an output clock from the PCM signal processor 59.

Figures 4, 5:
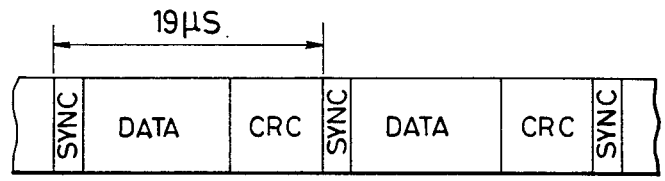
FIG. 4 shows one example of the structure of a digital FM signal.
FIG. 5 shows one example of the relationship between operation modes and recording data.

The digital FM signal output from the output terminal 62 is constituted by 132 blocks each separated from the adjacent blocks by synchronizing signals (referred to as "Sync", hereinafter) as shown in FIG. 4. Each block is constituted by the Sync, data and a correction code (referred to as "CRC", hereinafter). The duration or length of each block is about 19 $\mu$s. The data portion of each block stores data about the two-channel signals R, L and ID data. The recording condition data output from the controller 14 may be those which are shown in FIG. 5. In this Figure, bit 0 represents the recording method I, and when the multichannel PCM method is employed, "1" is set. Bit 1 represents the tape traveling direction, and when the direction is reversed, "1" is set. Bit 2 represents the recording mode, and when the LP mode is employed, "1" is set, Bit 3 represents the recording method II, and when the automatic reverse recording method is employed, "1" is set. Since the ID data is constituted by eight bits, data constituted by "1", "1", "1", "1","0", "0", "0", "0" is delivered to the ID signal generator 16 under the above-described set of recording conditions. This data is converted into a serial signal as it is and is then recorded. This ID data is stored in the data portion of each block shown in FIG. 4 at an interval of 1/60 sec (in the case of the NTSC system).

When the tape end is reached during recording under the above-described set of recording conditions, the tape end is detected by a tape end sensor 128, and on the basis of the detection signal output from the sensor 128, the controller 14 delivers commands to the servo circuit system, the audio circuit system and so forth so that the tape traveling direction is reversed and the channel select signal Ki is changed (e.g., from K1 to K2 shown in FIG. 2), thereby allowing an automatic continuous recording operation. In this case, the recording condition data delivered from the controller 14 is changed from "1", "1", "1", "1", "0", "0", "0", "0" to "1", "0", "1", "1", "0", "0", "0", "0". It is to be noted that the channel select signal Ki in the case where the tape traveling direction changes during a continuous recording operation may be recorded as data by employing bits 4 to 7 of the ID data (the recording condition 4 shown in FIG. 5 corresponds to this).

As described above, when recording is effected, recording conditions are recorded as ID data, together with the PCM signal.

The reproducing system block of the digital information recording and reproducing apparatus to which the present invention is applied will now be described with reference to FIG. 6. It is to be noted that the portions or members in the reproducing system block which have the same functions as those in the recording system block are denoted by the same reference numerals, and description thereof is omitted.

Figure 6:
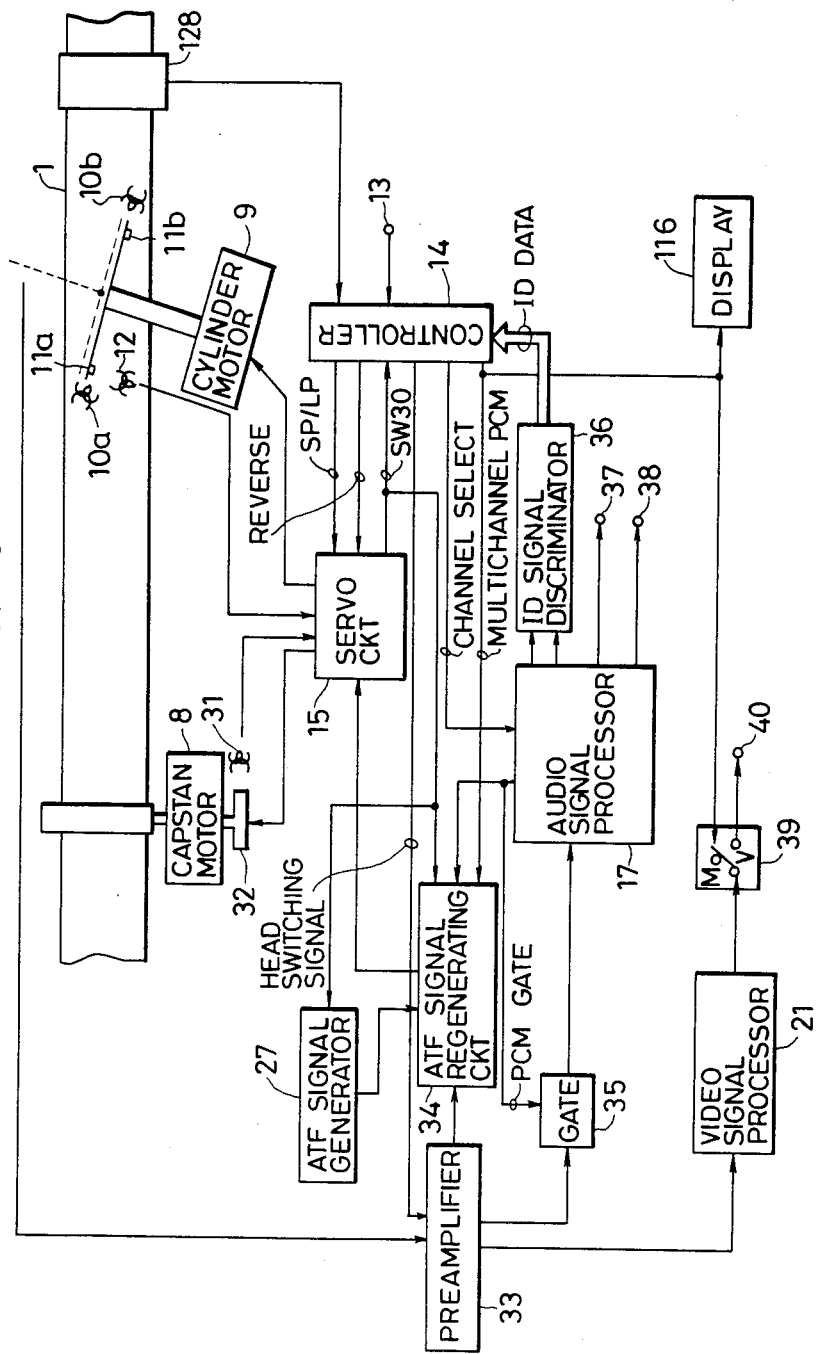
FIG. 6 is a block diagram showing circuits belonging to the reproducing system block in accordance with the embodiment.

Referring to FIG. 6, the signals reproduced from the magnetic tape by means of the rotary heads 10a, 10b, respectively, are amplified by a preamplifier 33. One of the thus amplified reproduced signals is input to an audio signal processor 17 through a gate 35, while the other signal is input to an ATF signal regenerating circuit 34 and a video signal processor 21. The audio signal processor 17 demodulates the digital signal back to the previous audio signal which is then output from output terminals 37, 38. The processor 17 separates ID data from the digital signal and outputs the ID data to an ID signal discriminator 36. In this case, the gate 35 is activated in response to a PCM gate signal generated in the audio signal processor 17 on the basis of the channel select signal Ki. The ID signal discriminator 36 delivers recording condition data on the basis of the reproduced ID data to the controller 14. The controller 14 in turn delivers commands to the servo circuit system, the audio circuit system and so forth on the basis of the reproduced recording condition data. In playing back a magnetic tape 1 which has been subjected to recording under the conditions set in the above description in relation to FIG. 1, that is:

(1) Tape traveling direction . . . reverse
(2) Recording mode . . . LP mode
(3) Recording method I . . . multichannel PCM method
(4) Recording method II . . . automatic reverse recording then, data constituted by "1", "1", "1", "0", "0", "0", "0", "0" is delivered from the ID signal discriminator 36 to the controller 14. On the basis of this data, the controller 14 controls the frequency divider and the like in the servo circuit 15 so that the capstan motor 8 is reversed, and the tape traveling speed is reduced to ½. Further, the ATF signal regenerating circuit 34 which effects tracking control is switched over for the multichannel PCM method. Since no video signal has been recorded in accordance with the above recording method, a switch 39 is connected to the M side to cut off the video output, and a display 116 which displays that the recording method employed is the multichannel PCM method is activated.

Figure 7:
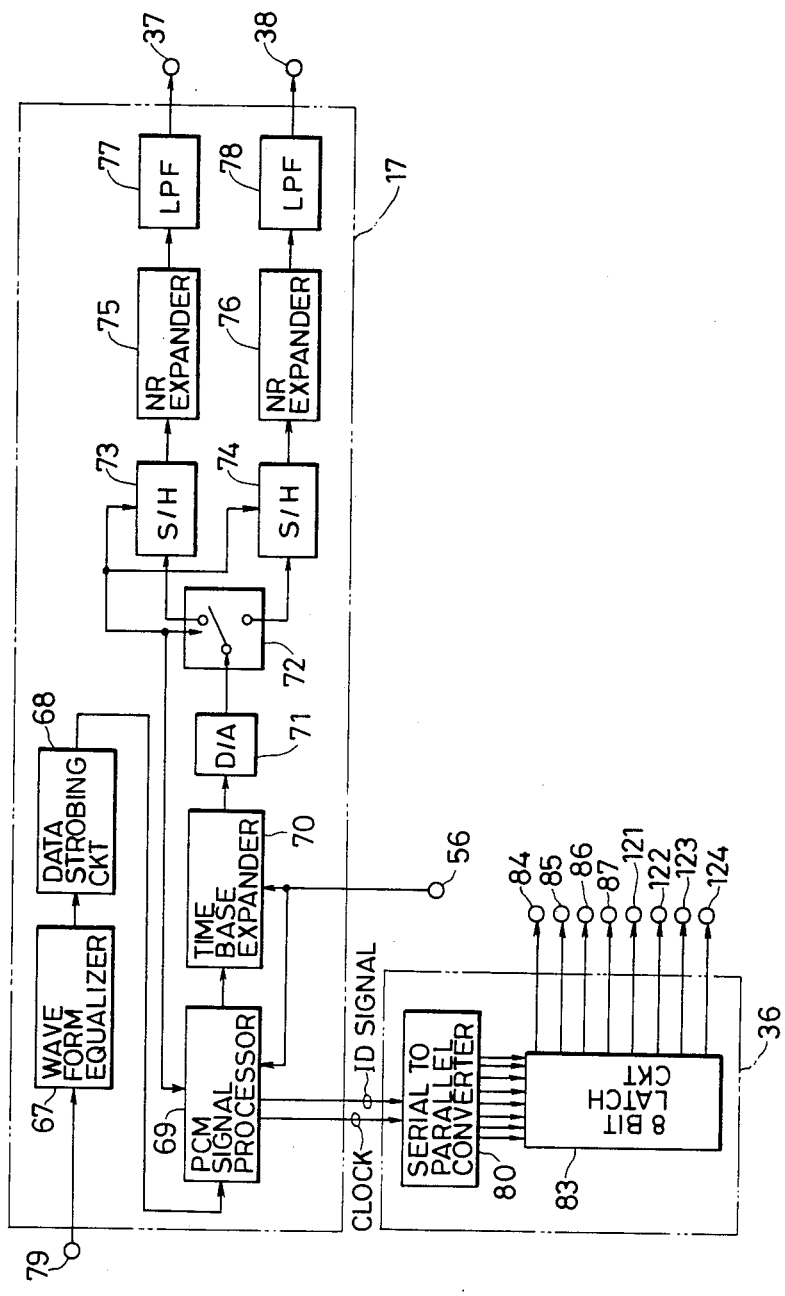
FIG. 7 is a block diagram of one example of each of the audio signal processor and ID signal discriminator in the reproducing system block.

One example of each of the audio signal processor 17 and the ID signal discriminator 36 in the reproducing system block will now be described with reference to FIG. 7.

The reproduced signals which are input to the audio signal processor 17 from an input terminal 79 is supplied to a wave form equalizer 67 where any wave form interference or the like is properly processed, and input to a data strobing circuit 68 wherein it is determined whether the reproduced signals are digital signals of "1" or "0". The digital signals are then input to a PCM signal processor 69 where they are subjected to digital demodulation and are then subjected to error correction and the like. The output signals from the PCM signal processor 69 are supplied to a time base expander 70 wherein the compressed time base is returned to the previous one. The output signals from the time base expander 70 are converted into respective analog signals in a digital-to-analog converter (referred to as "D/A", hereinafter) 71 and are then passed through a switch 72 and respective S/Hs 73, 74. Then, in each of the NR expanders 75, 76, the dynamic range compressed in recording is expanded to the previous level, and after any unnecessary band component is eliminated in each of the LPFs 77, 78, the analog signals are output from output terminals 37, 38 as reproduced audio signals, respectively. In this case, the switch 72 and the S/Hs 73, 74 operate in a manner similar to those in the recording system block shown in FIG. 1. The PCM signal processor 69 and the time base expander 70 operate on the basis of the channel select signal Ki input from an input terminal 56.

The ID signal discriminator 36 converts the ID signal regenerated in the PCM signal processor 69 into parallel signals by a serial-to-parallel converter 80 and then delivers the parallel signals to the controller 14 through output terminals 84 to 87 and 121 to 124 of an 8-bit latch circuit 83.

The following is a description of one example of the ATF signal regenerating circuit 34 for effecting tracking control.

Referring to FIG. 8, the reproduced signal input to the ATF signal regenerating circuit 34 from an input terminal 111 is supplied to a band-pass filter (referred to as "BPF", hereinafter) 94 where 4-frequency pilot signals are separated from the signal. The separated signals are input to a multiplier 95 where they are multiplied by the 4-frequency pilot signals generated by the ATF signal generator 27. As has been described with respect to the recording system block shown in FIG. 1, the pilot signals $f_1$ to $f_4$ output from the ATF signal generator 27 are interchanged in accordance with the High and Low levels of the SW 30 associated with the rotary heads 10$a$, 10$b$ and are successively output in such a manner that when the SW 30 is at High level, the signal $f_1$ or $f_3$ is output, while when the SW 30 is at Low Level, the signal $f_2$ or $f_4$ is output.

The fH (horizontal synchronizing signal frequency) component and the 3 fH component are separated from the output signal from the multiplier 95 by BPFs 96, 98, respectively, and the envelopes of these components are respectively obtained by envelope detectors 97, 99. The obtained envelopes are compared with each other by a comparator 100. The output (tracking error signal) of the comparator 100 is passed through a switch 101, an S/H 102, a buffer amplifier 104, LPFs 105, 106 and a switch 110 and is then output from an output terminal 113 to the servo circuit 15 which controls the capstan motor so that the difference between the envelopes becomes zero. Since a burst-like reproduced signal is obtained in the case of play back a magnetic tape on which a recording has been effected by the multichannel PCM method, the S/H 102 is employed in order to use information obtained only during the interval within which the reproduced signal is present. The S/H 102 is controlled by an AND circuit 108 and an OR circuit 107 such that in the multichannel PCM method, the S/H 102 is controlled on the basis of the PCM gate signal Li (see FIGS. 2G, 2H and 2I) generated by the audio signal processor 17, while in the video signal recording method, the S/H 102 is constantly maintained in a conductive state. Further, the band of the comparator output signal (tracking error signal) output to the servo circuit 15 is also interchanged with another by the switch 110 in accordance with the recording method employed. Discrimination between these recording methods is automatically made on the basis of the ID data, that is the recording condition data, obtained from the PCM signal.

When the tape end is reached during a reproducing operation, necessary processing is also carried out on the basis of the ID data. More specifically, when a continuous recording has been effected on the tape, that is, when the bit 3 of the ID data is "1", reversion of the tape traveling direction and change of the channel select signal Ki are automatically effected through the controller 14.

Furthermore, in accordance with the information represented by the bits 5 to 7 of ID data shown in FIGS. 13 or 14, the controller 14 specifies the number of the channel to be played back and retrieves a recording start point and a recording track changeover point. Thus, it becomes possible to automatically and continuously reproduce music or the like continuously recorded by utilizing a blank space of a recorded tape. In addition, since it is possible to detect a recording track changeover point and a recording start point, the present invention can be applied to search a desired portion of a tape and to detect a blank space.

Figure 9:
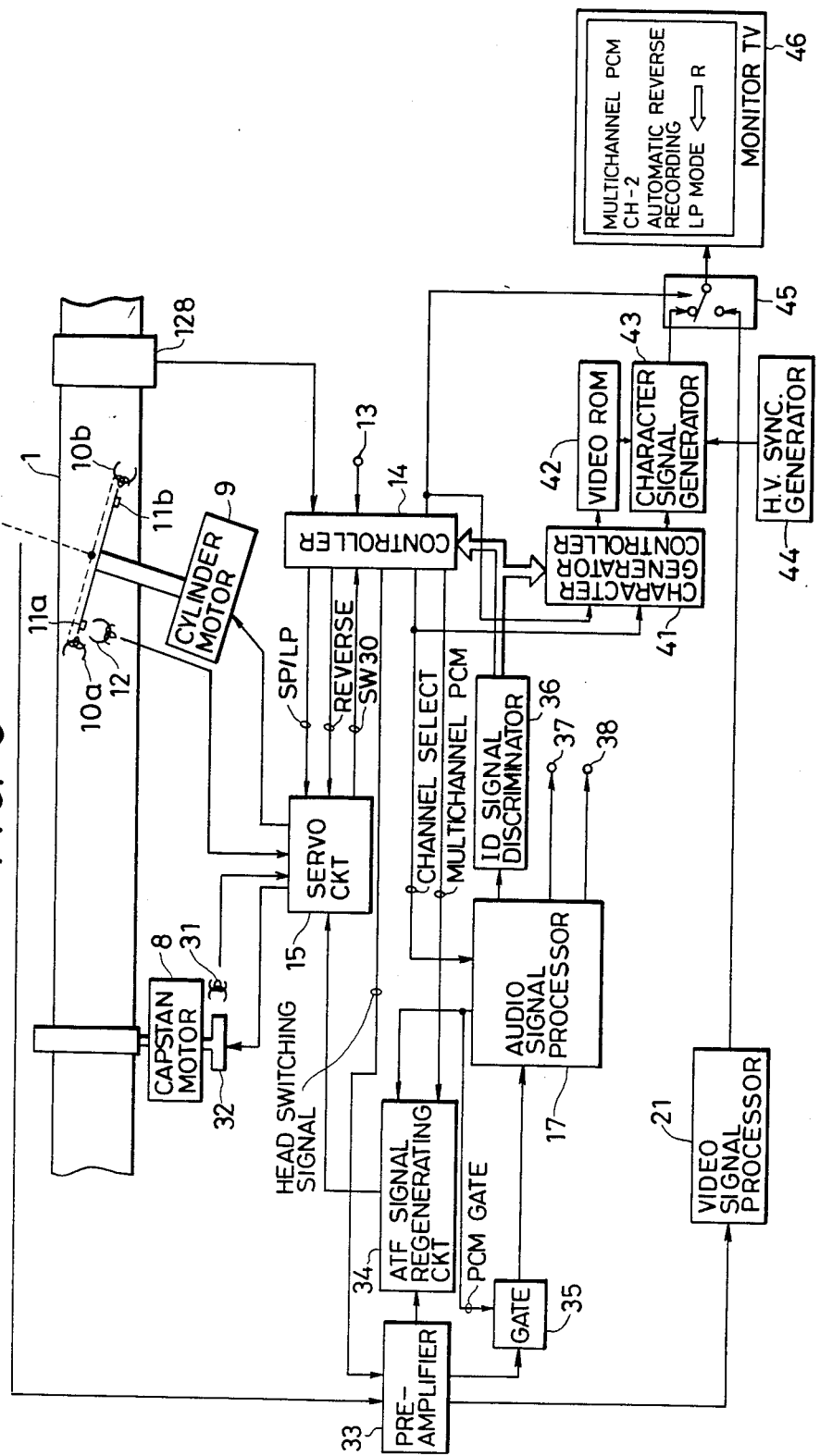
FIG. 9 is a block diagram of another example of the reproducing system block according to the present invention.

FIG. 9 shows another example of the reproducing system block of the digital information recording and reproducing apparatus to which the present invention is applied. It is to be noted that the portions or members in this reproducing system block which have the same functions as those in the arrangement shown in FIG. 6 are denoted by the same reference numerals. Only the points in which the arrangement shown in FIG. 9 differs from that shown in FIG. 6 will be described below.

The reproducing system block shown in FIG. 9 is arranged such that when the recording method concerned is identified as the multichannel PCM method from the ID data in the reproduced PCM signal, the ID data, that is, information about the recording conditions, is output to a TV monitor. More specifically, when the recording method is identified as multichannel PCM method from the ID data, information represented by the ID data is generated in the form of a character signal by a character generator controller 41, a video ROM 42, a character signal generator 43 and a horizontal and vertical synchronizing signal generator (referred to as "H.V.sync. generator", hereinafter) 44 and is output to a monitor TV 46 through a switch 45. For example, when the reproduced ID data is constituted by "1", "1", "1", "1", "0", "0", "0", "0", this represents the following recording conditions from the assumption shown in FIG. 5:

(1) Tape traveling direction . . . reverse
(2) Recording mode . . . LP mode
(3) Recording method I . . . multichannel PCM method
(4) Recording method II . . . automatic reverse recording Therefore, character information such as that shown in the TV monitor 46 in FIG. 9 is output.

It is to be noted that the switch 45 is automatically controlled through the controller 14 in accordance with the state of the bit 0 in the ID data.

Figure 10:
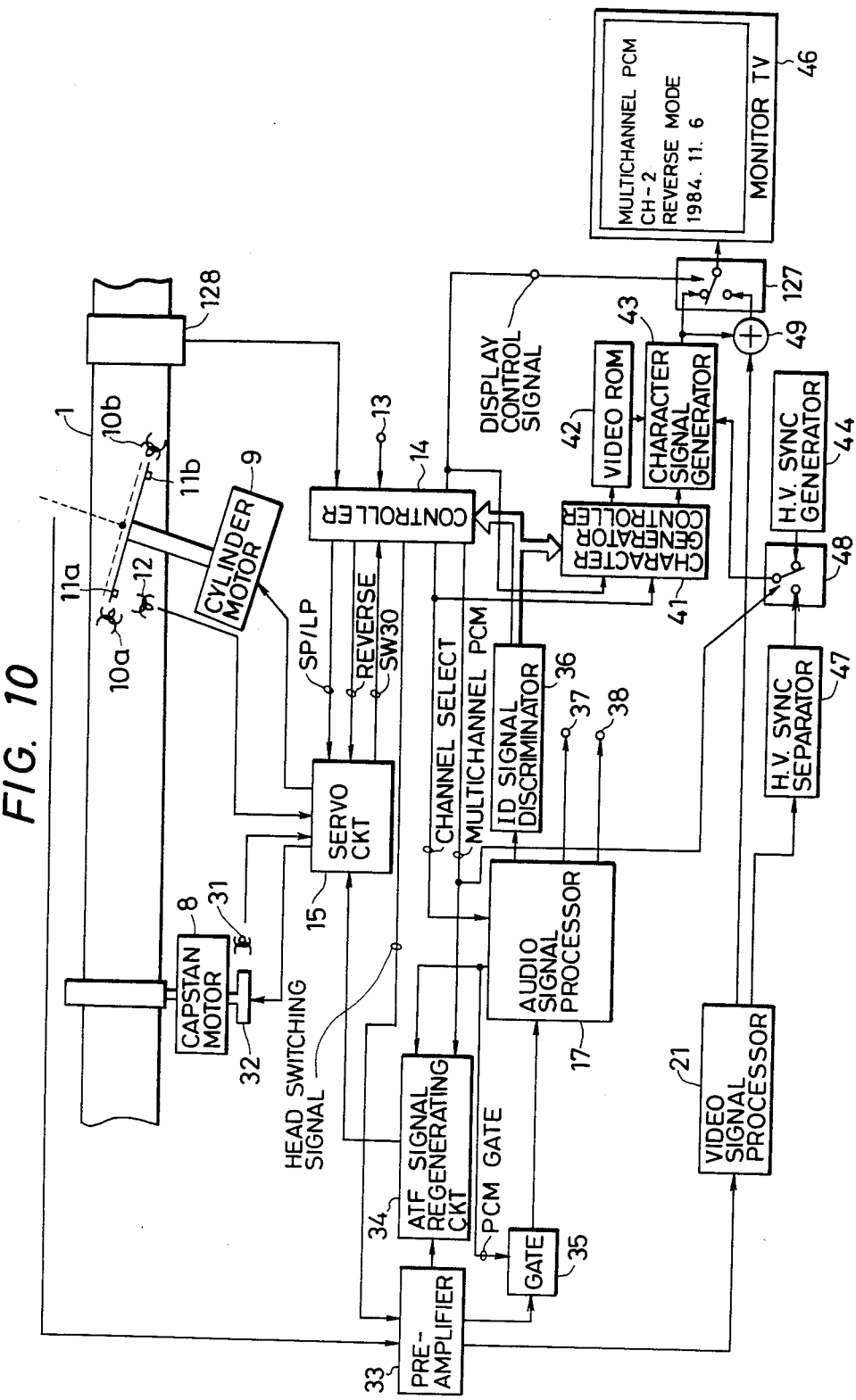
FIG. 10 is a block diagram of still another example of the reproducing system block according to the present invention.
Figure 11:
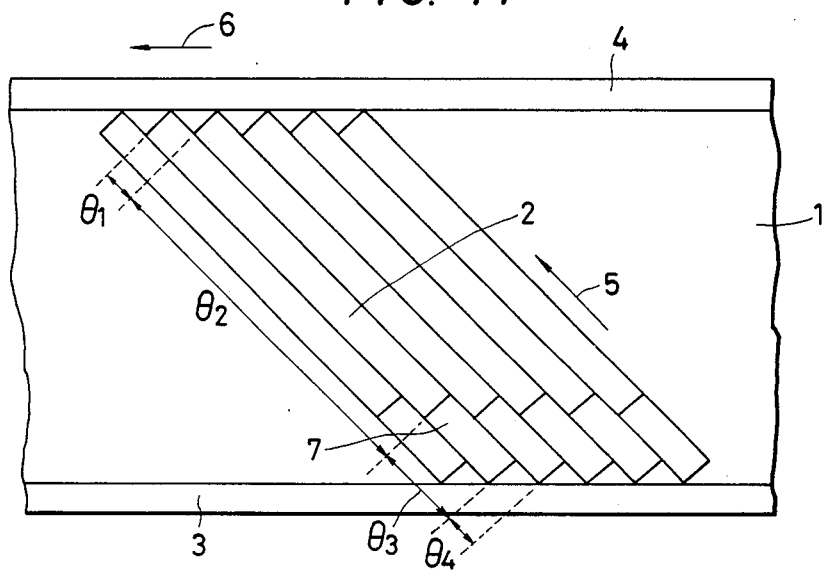
FIG. 11 shows a recording pattern in accordance with the 8-mm video standard.
Figure 12:
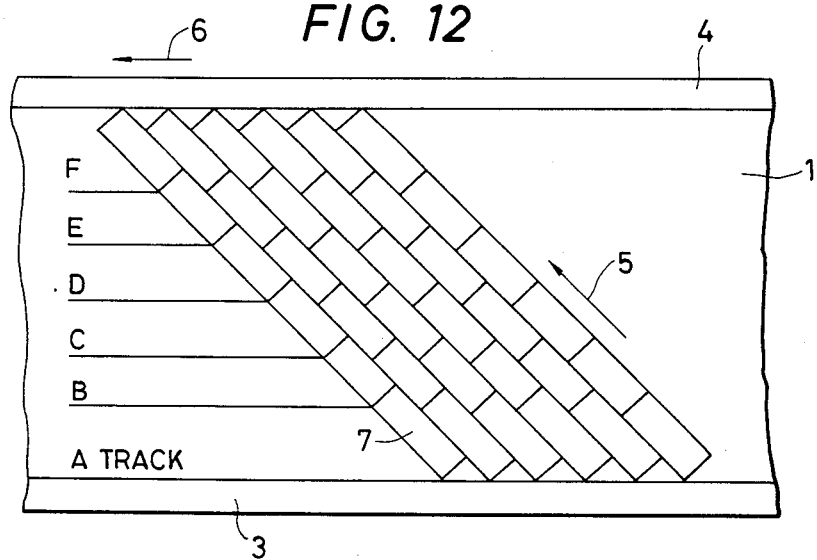
FIG. 12 shows a recording pattern in accordance with a recording system block improved in the audio signal recording density.

FIG. 10 shows still another example of the reproducing system block according to the present invention. The reproducing system block shown in FIG. 10 is arranged such that information represented by ID data can be output to the TV monitor even the case of in the video signal recording method for recording a video signal.

In the video signal recording method, information represented by ID data is superimposed on a reproduced video signal and in output to the TV monitor 46 through a switch 48 operating in accordance with the state of the bit 0 in the ID data, an H.V.sync. separator 47 which separates horizontal and vertical synchronizing signals from the reproduced video signal, an adder 49, and a switch 127.

According to the above-described embodiment, it is possible to record recording conditions such as the tape traveling direction and SP/LP mode, together with the audio signal, and to automatically interchange the operation modes of the system at the time of reproduction in accordance with the recording conditions. Thus, it is possible to greatly improve the long term recording and reproducing characteristics of the multichannel PCM method and controllability of the apparatus.

Figure 15:
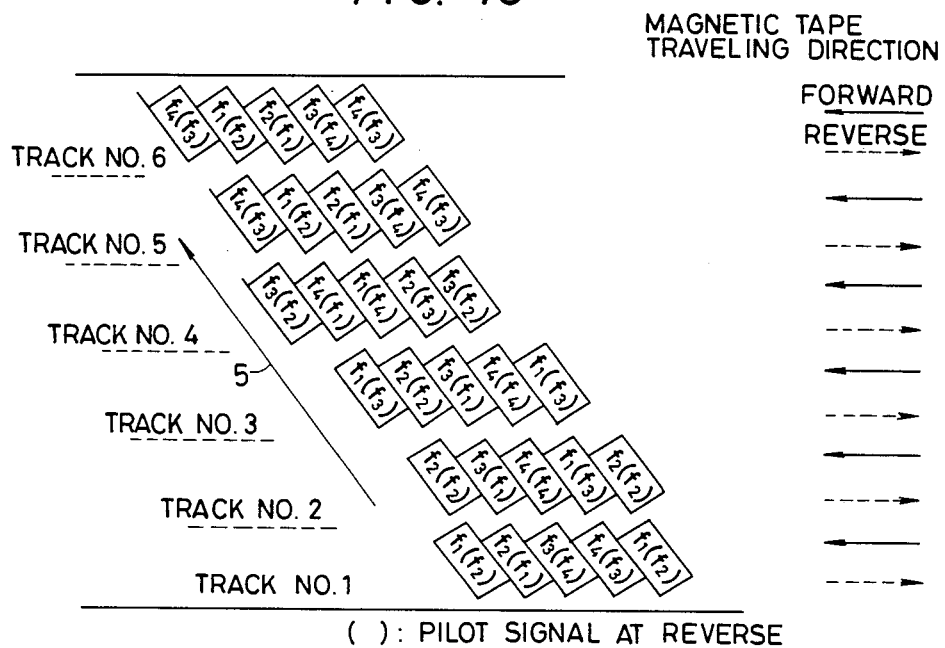
FIGS. 15 to 19 respectively show examples of recording pattern.
Figure 16:
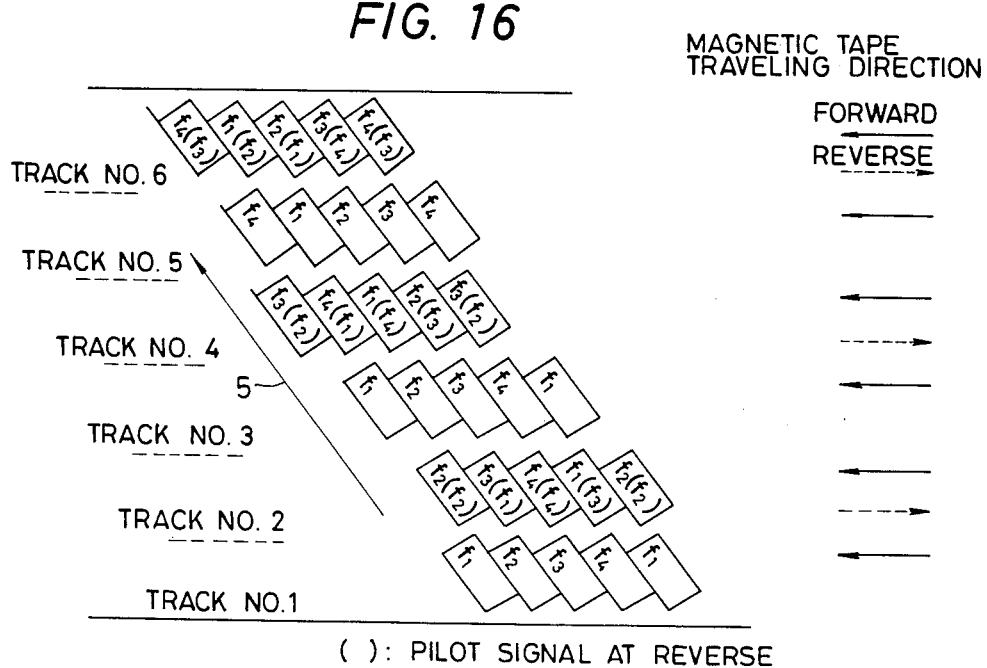
Figure 17:
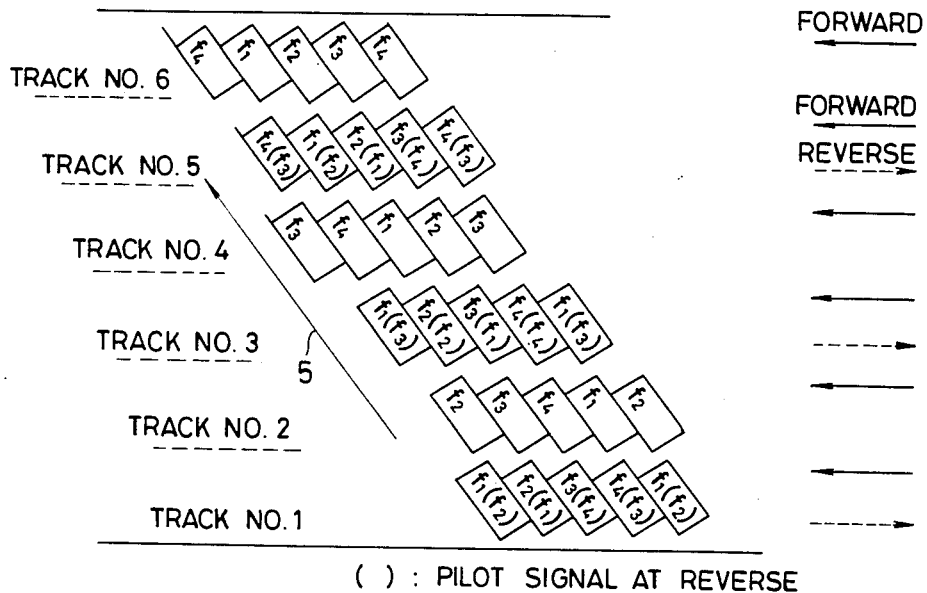
Figure 18:
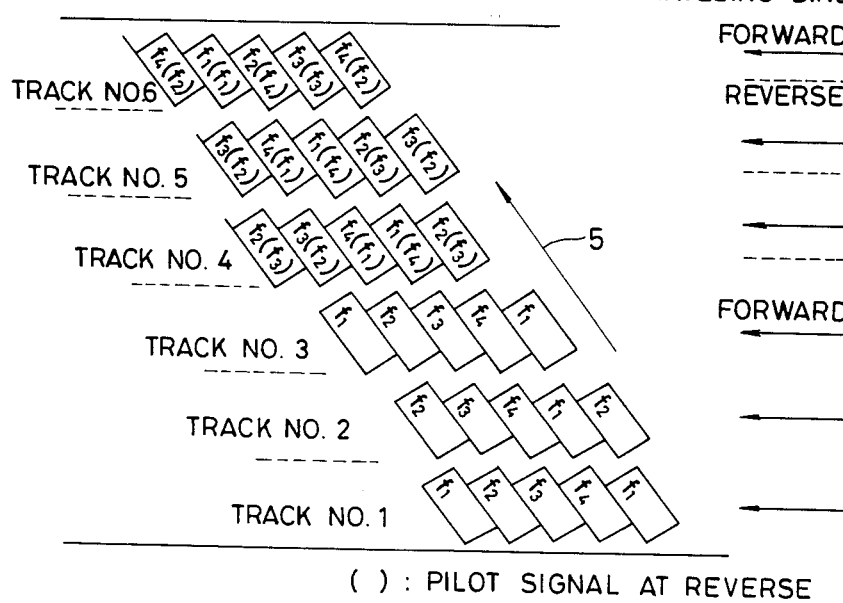
Figure 19:
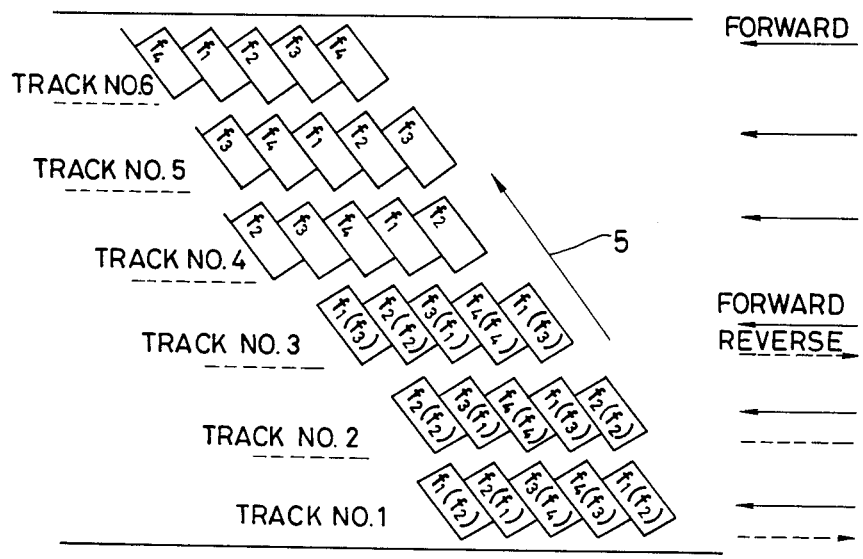

In the above-described embodiment, all the tracks No. 1 to No. 6 allow information to be recorded thereon and reproduced therefrom in either the forward or reverse direction, as shown in FIG. 15. However, the system may be arranged such that only the even-number (or odd-number) tracks allow information to be recorded thereon and reproduced therefrom in both the forward and reverse directions, or only the tracks No. 1 to 3 (or No. 4 to 6) allow recording and reproduction in both directions, as shown in FIGS. 16 to 19. For example, in the system shown in FIG. 16, the odd-number tracks are fixed for recording and reproduction only in the forward direction. It is therefore unnecessary to discriminate between the tape traveling directions in a reproducing operation, and consequently, it is not necessary to store the tape traveling direction information into the ID signal or the like at the time of recording with respect to the tracks for which the tape traveling direction is fixed.

Further, as shown in FIGS. 15 to 19, the tracking pilot signals $f_1$ to $f_4$ are recorded in that order, $f_1 \rightarrow f_2 \rightarrow f_3 \rightarrow f_4 \rightarrow f_1$, in terms of the time base regardless of the tape traveling direction. This offers the advantage that it is possible for the same circuit to generate the tracking pilot signals and effect recording and reproducing tracking controls regardless of the tape traveling direction. As a result, it is possible for the same ATF tracking circuit to be used in both a system which allows recording and reproduction only in the forward direction and in a system which allows recording and reproduction in both forward and reverse directions, which advantageously leads to a reduction in costs.

The above-described digital information recording and reproducing apparatus, which enables a video signal to be also recorded, involves two systems, that is, the NTSC and CCIR systems, which are different from each other in terms of the number of revolutions of the rotary cylinder, the former employing 30 Hz and the latter 25 Hz as the standard. These two systems are not interchangeable with each other.

Unlike the television system, audio systems are common to each other throughout the world in terms of the monitor system.

In consequence, for the multichannel PCM type video system which can be used also as an audio system, it is a great merit that the system can play back any tape regardless of whether it has been recorded by the NTSC system or the CCIR system. In addition, it is not necessary for prerecorded tapes to be produced so as to match these two systems, respectively, resulting in a remarkable reduction in costs.

Figure 20:
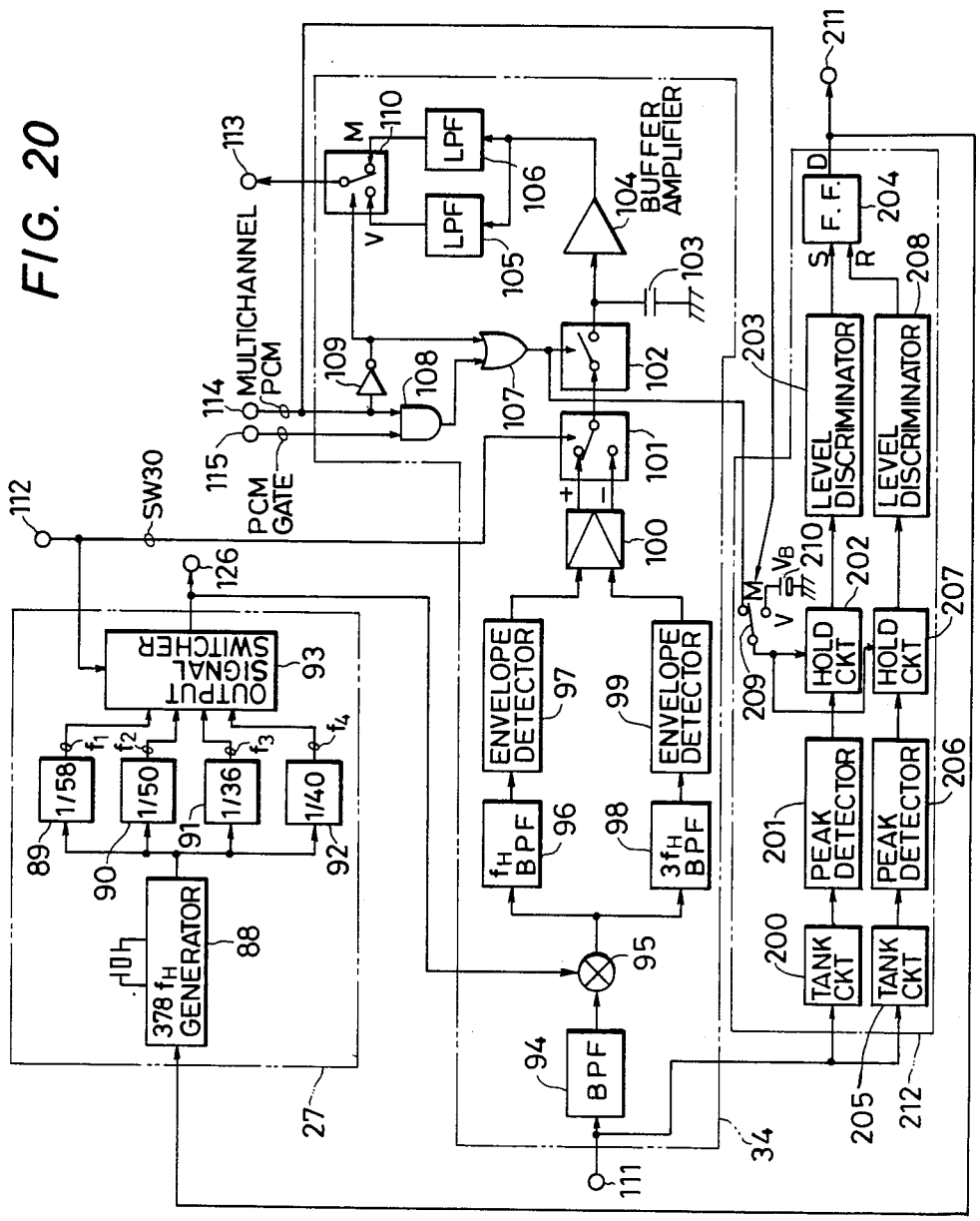
FIG. 20 is a block diagram of one example of the system discriminator.

The following is a description of a method of determining whether a recording on a tape has been effected by the NTSC system or the CCIR system and then changing over the operating system of the digital information recording and reproducing apparatus so as to match the NTSC system or the CCIR system. FIG. 20 is a block diagram showing one practical example of a system discriminator. In this embodiment, the discrimination between the two systems is effected by making use of the fact that the tracking pilot signal frequency in the reproduced signal differs depending upon the reproducing system employed, that is, the NTSC system or the CCIR system. More specifically, the tracking pilot signal frequency takes values as shown in Table 1 since the rotary cylinder speeds in the two systems are different from each other: 1,500 r.p.m. (CCIR); 1,800 r.p.m. (NTSC).

TABLE 1

| Recording system | Reproducing system | |
|---|---|---|
| | NTSC | CCIR |
| NTSC | $f_1$ = 102.54 kHz | $f_1$ = 85.55 kHz |
| | $f_2$ = 118.95 kHz | $f_2$ = 99.23 kHz |
| | $f_3$ = 165.21 kHz | $f_3$ = 137.81 kHz |
| | $f_4$ = 148.69 kHz | $f_4$ = 124.04 kHz |
| CCIR | $f_1$ = 121.10 kHz | $f_1$ = 101.02 kHz |
| | $f_2$ = 140.48 kHz | $f_2$ = 117.19 kHz |
| | $f_3$ = 195.11 kHz | $f_3$ = 162.76 kHz |

TABLE 1-continued

| Recording system | Reproducing system | |
|---|---|---|
| | NTSC | CCIR |
| | f₄ = 175.59 kHz | f₄ = 146.48 kHz |

Referring to FIG. 20, a system discriminator 212 is composed of a tank circuit 200 - a center frequency of 195 KHz, Q=20 -, a tank circuit 205 - a center frequency of 85.55 KHz, Q=20-, peak detectors 201, 206, hold circuits 202, 207, level discriminators 203, 208, a switch 209, a power supply 210 and an RS flip-flop (referred to as "RS-F.F.", hereinafter) 204. In the case where a tape on which a recording has been effected by the NTSC system is played back by the digital information recording and reproducing apparatus when operating as a CCIR system video tape recorder, the pilot signal frequency in the reproduced signal takes values such as those shown in Table 1. Accordingly, a pilot signal which corresponds to the frequency $f_1$ is separated from the reproduced signal input from an input terminal 111 by the tank circuit 205, but no pilot signal is separated by the tank circuit 200. The outputs of the tank circuits 200, 205 are detected by the peak detectors 201, 206 and passed through hold circuit 202, 207 and are then input to the level discriminators 203, 208, respectively. Each of the level discriminators 203, 208 determines whether or not there is any pilot signal separated by the corresponding tank circuit 200 or 205, and outputs "1" when a pilot signal is available and outputs "0" when no pilot signal is available. Accordingly, in the above case, the level discriminator 203 outputs "0", while the level discriminator 208 outputs "1", and the RS-F.F. 204 is thereby reset to output "0" from an output end 211, thus causing the operating system of each block to be changed over to the NTSC system. In the case where a tape on which a recording has been effected by the CCIR is played back by the apparatus when operating as an NTSC system video tape recorder, a pilot signal is output only from the tank circuit 200 as will be understood from Table 1. In consequence, the level discriminator 203 outputs "1", while the level discriminator 208 outputs "0", and the RS-F.F. 204 is thereby set to output "1" from the output end 211. In response to the output signal from the output end 211, the operation system of each block is changed over to the CCIR system.

When the operation system of the video tape recorder and the signal format of a tape to be played back are the same as each other, both the level discriminators 203, 208 output "0", and the output state of the RS-F.F. 204 has no change; therefore, the operation system is not changed over.

Table 2 shows the relationship between the respective outputs of the level discriminators 203, 208 and the output of the RS-F.F. 204.

TABLE 2

| No. | Reproducing system | Tape | Output of level discriminator 203 | Output of level discriminator 208 | Output of R.S.-F.F. |
|---|---|---|---|---|---|
| 1 | NTSC | CCIR | 1 | 0 | 1 |
| 2 | NTSC | NTSC | 0 | 0 | No change |
| 3 | CCIR | NTSC | 0 | 1 | 0 |
| 4 | CCIR | CCIR | 0 | 0 | No change |

Figure 21:
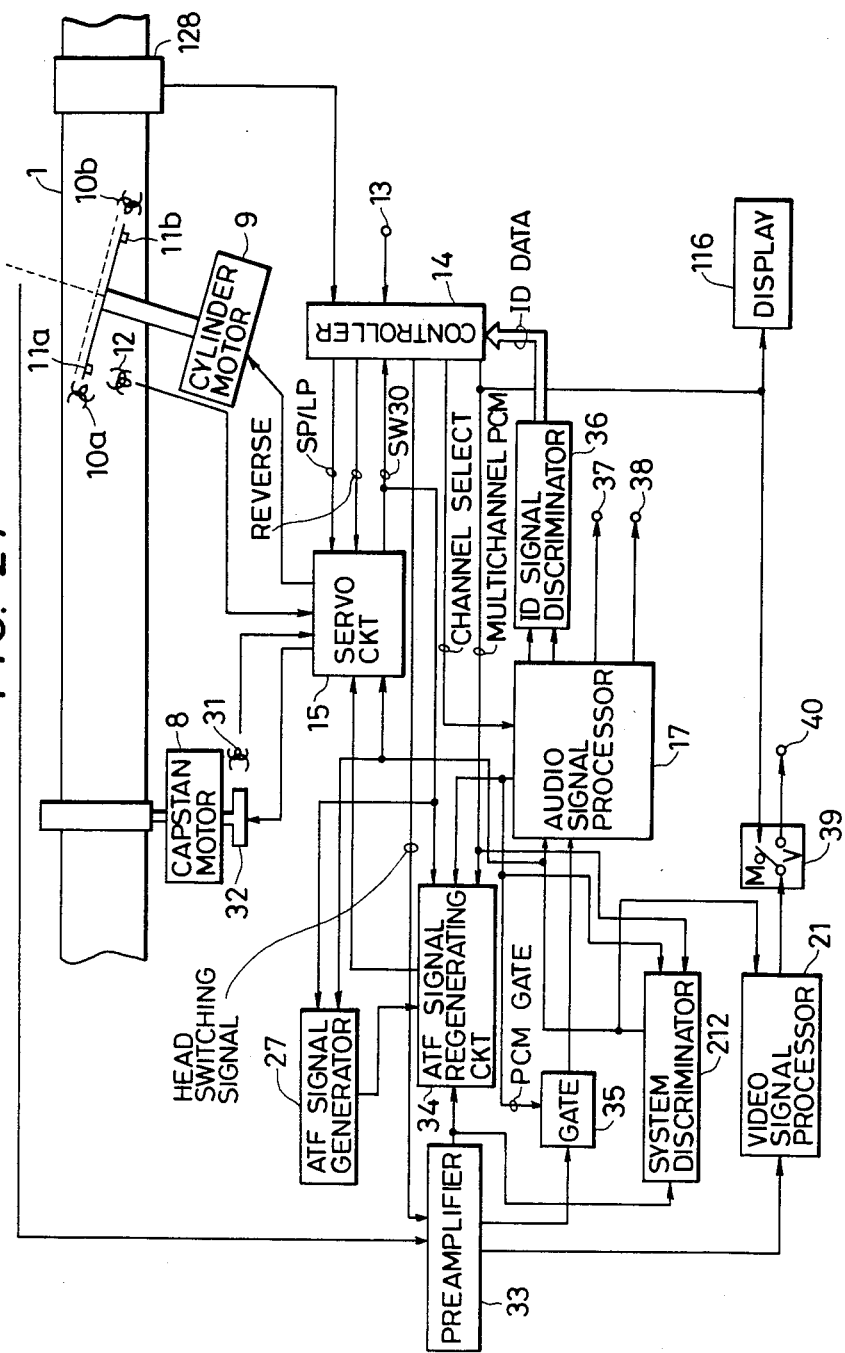
FIG. 21 is a block diagram of further example of the reproducing system block including the system discriminator.

It is to be noted that the whole system block including the system discriminator 212 is arranged such as that shown in FIG. 21. In response to the output of the system discriminator 212, the operation system of each of the video signal processor 21, the audio signal processor 17, the servo circuit 15 and the ATF signal generator 27 is changed over between the NTSC system and the CCIR system.

As has been described above, it is possible to readily discriminate the system one from the other by utilizing the frequency deviation of the pilot signal in the reproduced signal. This embodiment is not limited to this configuration, and any other arrangement may be employed, provided that the arrangement employed utilizes the frequency deviation of the pilot signal in the reproduced signal, for example, a system discriminator using the tank circuit 200 (shown in FIG. 20) alone.

What is claimed is:

1. An apparatus for recording and reproducing a video signal and for recording and reproducing a PCM audio signal in forward and reverse tape traveling directions by a multichannel PCM method, wherein a recording track which is inclined at a predetermined angle with respect to the tape traveling direction is formed by a rotary magnetic head, and a video signal is recorded on a main section of said recording track during a video recording mode, and a PCM audio signal is recorded on a plurality of tracks obtained by dividing said main section of said recording track during a multichannel PCM mode, said apparatus comprising:

means for choosing the tape traveling direction to travel in a forward or reverse direction at every track of said plurality of tracks so that the PCM audio signal is recorded on and reproduced from each of said plurality of tracks in the forward or reverse tape traveling direction;

means for generating a signal representing conditions set at the time of recording including at least the traveling direction of the magnetic tape at the time of recording;

means for discriminating during reproduction the recording conditions from the signal representing the recording conditions; and control means for setting conditions at the time of reproduction on the basis of the discriminated recording conditions;

wherein at the time of recording, the signal representing recording conditions is recorded on the same track as the track on which said PCM audio signal is recorded, and at the time of reproduction, reproduction conditions are set to be the same as the recording conditions in accordance with the signal representing recording conditions reproduced.

2. An apparatus according to claim 1, wherein said signal representing recording conditions further represents at least one of the recording conditions including either the standard play or long play mode, either the video signal recording or multichannel PCM mode, and automatic reverse recording.

3. An apparatus according to claim 1, further comprising:

means for generating pilot signals for effecting a tracking control;

means for adding the pilot signals to the video signal or the PCM audio signal so as to record the pilot signals together with the video signal or the PCM audio signal; and means for effecting the tracking control at the time of reproduction on the basis of the pilot signals reproduced.

4. An apparatus according to claim 3, further comprising means for determining whether a recording on a magnetic tape has been effected by the NTSC system or the CCIR system on the basis of frequencies of the pilot signals reproduced.

* * * * *